United States Patent
Thomas (10) Patent No.: US 10,353,362 B2
(45) Date of Patent: Jul. 16, 2019

(54) METHOD AND SYSTEM FOR PREDICTIVE AIR FILTER MAINTENANCE FOR SUSTAINED INDOOR AIR QUALITY

(71) Applicant: UL LLC, Northbrook, IL (US)

(72) Inventor: Tithosh Thomas, Buffalo Grove, IL (US)

(73) Assignee: UL LLC, Northbrook, IL (US)

( * ) Notice: Subject to any disclaimer, the term of this patent is extended or adjusted under 35 U.S.C. 154(b) by 76 days.

(21) Appl. No.: 15/586,000

(22) Filed: May 3, 2017

(65) Prior Publication Data

US 2018/0318746 A1 Nov. 8, 2018

(51) Int. Cl.

| G05B 15/02 | (2006.01) |
|---|---|
| F24F 11/63 | (2018.01) |
| F24F 11/39 | (2018.01) |
| F24F 11/37 | (2018.01) |
| F24F 110/10 | (2018.01) |
| F24F 110/20 | (2018.01) |
| F24F 110/50 | (2018.01) |

(Continued)

(52) U.S. Cl.
CPC ............. *G05B 15/02* (2013.01); *F24F 11/37* (2018.01); *F24F 11/39* (2018.01); *F24F 11/63* (2018.01); *F24F 11/58* (2018.01); *F24F 2110/10* (2018.01); *F24F 2110/20* (2018.01); *F24F 2110/50* (2018.01); *F24F 2110/64* (2018.01); *F24F 2110/66* (2018.01); *F24F 2110/72* (2018.01)

(58) Field of Classification Search
None
See application file for complete search history.

(56) References Cited

U.S. PATENT DOCUMENTS

| 5,351,035 A | 9/1994 | Chrisco |
|---|---|---|
| 5,850,183 A | 12/1998 | Berry, III |

(Continued)

FOREIGN PATENT DOCUMENTS

WO WO-2004020965 A1 3/2004

OTHER PUBLICATIONS

Lin et al., An Air-Filter Sensor for Home-Used Air Conditioners, Proceedings of the 2003 American Society for Engineering Education Annual Conference & Exposition © 2003, pp. 8. 179.1-179.9 (2003).

*Primary Examiner* — Ryan A Jarrett
(74) *Attorney, Agent, or Firm* — Marshall, Gerstein & Borun LLP; Randall G. Rueth (57) ABSTRACT

Systems and methods for maintaining indoor air quality are disclosed. According to embodiments, air quality data measurements and associated dates/times may be received from smart sensors associated with an indoor space. Based on the air quality data detected by the smart sensors, a predictive air quality model for the indoor space may be generated, e.g., by plotting a time series for the air quality data and deriving a linear progression based on the plotted time series. A future time when the air quality for the indoor space will reach a threshold air quality level, above which an allergic or asthmatic reaction may occur in a user, may be predicted using the predictive air quality model. An indication may be displayed notifying a user that an air filter associated with the indoor space should be replaced at or before the predicted future time to prevent an allergic or asthmatic reaction.

20 Claims, 3 Drawing Sheets

(51) Int. Cl.
*F24F 110/64* (2018.01)
*F24F 110/72* (2018.01)
*F24F 110/66* (2018.01)
*F24F 11/58* (2018.01)

(56) References Cited

U.S. PATENT DOCUMENTS

| | | |
|---|---|---|
| 6,107,923 A | 8/2000 | Christol |
| 6,842,117 B2 | 1/2005 | Keown |
| 6,993,414 B2 | 1/2006 | Shah |
| 7,253,743 B2 | 8/2007 | Liang et al. |
| 7,261,762 B2 | 8/2007 | Kang et al. |
| 8,613,792 B2 | 12/2013 | Ragland et al. |
| 8,734,565 B2 | 5/2014 | Hoglund et al. |
| 8,892,223 B2 | 11/2014 | Leen et al. |
| 9,092,040 B2 | 7/2015 | Fadell et al. |
| 9,285,802 B2 | 3/2016 | Arensmeier |
| 2004/0112273 A1 | 6/2004 | Thoede et al. |
| 2005/0247194 A1 | 11/2005 | Kang et al. |
| 2010/0163633 A1 | 7/2010 | Barrett et al. |
| 2012/0125592 A1 | 5/2012 | Fadell et al. |
| 2016/0178228 A1 | 6/2016 | Shahabdeen |
| 2016/0179065 A1 | 6/2016 | Shahabdeen |
| 2017/0328591 A1* | 11/2017 | Kelly .................... B01D 46/46 |
| 2017/0361259 A1* | 12/2017 | Fox .......................... F24F 3/16 |
| 2018/0140989 A1* | 5/2018 | Arthur .................... H04W 4/38 |

\* cited by examiner

METHOD AND SYSTEM FOR PREDICTIVE AIR FILTER MAINTENANCE FOR SUSTAINED INDOOR AIR QUALITY

TECHNICAL FIELD

The present disclosure generally relates to technology for predictive air filter maintenance based on air quality data.

BACKGROUND

Many individuals suffer from allergies or are otherwise sensitive to air quality. In order to prevent allergic reactions or other complications, particular air quality standards are desirable in indoor environments. Air filters can help to maintain air quality standards in an indoor environment. However, air filters become less effective over time for various reasons and must be periodically replaced.

SUMMARY

A computer-implemented method for maintaining indoor air quality is provided. The method may include receiving air quality data from one or more smart sensors placed in an indoor space and configured to detect and transmit air quality data associated with the indoor space, wherein the air quality data includes one or more measurement of at least one of humidity, temperature, carbon monoxide, particulate matter count, or volatile compound level, and a time associated with each measurement; generating, by a processor, a predictive air quality model for the indoor space by plotting a time series for the received air quality data and deriving a linear progression for the air quality data based on the plotted time series; receiving an indication of a required threshold air quality level for preventing an allergic or asthmatic reaction in a user associated with the indoor space, wherein the required threshold air quality level includes a measurement of at least one of humidity, temperature, carbon monoxide, particulate matter count, or volatile compound level, above which an allergic or asthmatic reaction is likely to occur in the user; predicting, by a processor, using the predictive air quality model, a future time when the air quality for the indoor space will reach the threshold air quality level; and displaying an indication that an air filter associated with the indoor space should be replaced at or before the predicted future time.

In another aspect, an electronic device for maintaining indoor air quality is provided. The electronic device may include a transceiver configured to communicate data via at least one network connection, a memory configured to store non-transitory computer executable instructions, and a processor configured to interface with the transceiver and the memory, and configured to execute the non-transitory computer executable instructions. The non-transitory computer executable instructions may cause the processor to receive air quality data from one or more smart sensors placed in an indoor space and configured to detect and transmit air quality data associated with the indoor space, wherein the air quality data includes one or more measurement of at least one of humidity, temperature, particulate matter count, or volatile compound level, and a time associated with each measurement; generate a predictive air quality model for the indoor space by plotting a time series for the received air quality data and deriving a linear progression for the air quality data based on the plotted time series; receive an indication of a required threshold air quality level for preventing an allergic or asthmatic reaction in a user associated with the indoor space, wherein the required threshold air quality level includes a measurement of at least one of humidity, temperature, particulate matter count, or volatile compound level, above which an allergic or asthmatic reaction is likely to occur in the user; predict, using the predictive air quality model, a future time when the air quality for the indoor space will reach the threshold air quality level; and display an indication that an air filter associated with the indoor space should be replaced at or before the predicted future time.

DETAILED DESCRIPTION

The embodiments described herein relate to, inter alia, systems and techniques for predicting when an air filter should be replaced in order to maintain a level of air indoor air quality. In some embodiments, users may set the system according to their air quality needs or preferences, and the size of their indoor space. A user with allergies to dust mites, for instance, may install the system in his or her home for an indication of when to change an HVAC air filter in order to maintain a lower level of dust in the air. One or more smart sensors may detect indicators of indoor air quality, such as particulate matter in the air, humidity, temperature, etc., and transmit these measurements/indicators to a server in order to generate a predictive air quality model. The predictive air quality model may additionally or alternatively incorporate air quality data from external databases, such as governmental air quality standards, or outdoor air quality information. One of the outputs of the predictive air quality model may be an indication of when an air filter should be replaced based on the user settings. Another output may be a signal triggering the activation of an HVAC fan in response to a sudden change in air quality data.

Figure 1:
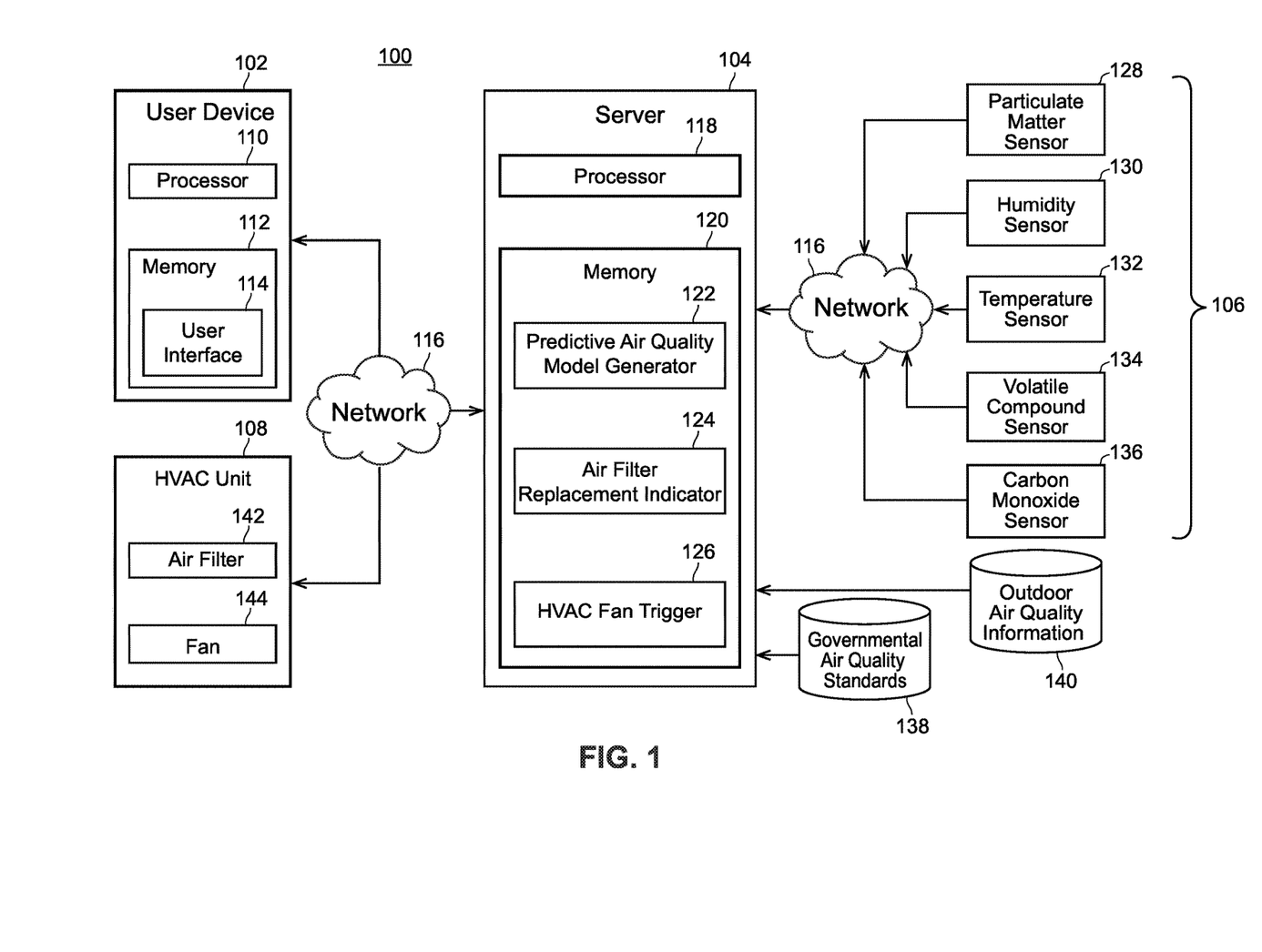
FIG. 1 depicts an exemplary system for predictive air filter maintenance for sustained indoor air quality.

FIG. 1 depicts an exemplary system for predicting when an air filter should be replaced. The system may include a user device 102, a sever 104, variety of smart sensors 106, and an HVAC unit 108. The user device 102 may be any suitable device with one or more processors 110 and a memory 112, such as a wall-mounted device, a smartphone, a laptop computer, a desktop computer, a tablet, or a wearable device, for example. The memory 112 may be a computer-readable, non-transitory storage unit or device, or collection of units/devices, and may include persistent (e.g., hard disk) and/or non-persistent memory components. The memory 112 may store instructions that are executable on one or more processors 110 of the user device 102 to perform various operations, including the instructions of various software applications and the data that is generated and/or used by such applications.

The user device 102 may be configured to display a user interface 114 and/or receive selections and inputs via the user interface 114. The memory 112 may include instructions for executing a user interface application 114 that is configured to operate on the electronic device may display the user interfaces. In particular, a user may use the user interface 114 to enter air quality settings and preferences. For instance, the user interface 114 may be configured to receive information about allergies, asthmatic conditions, or any other air quality sensitivities a user may experience. Specifically, the user may enter input indicating types of allergies, such as dust, mold, pollen, etc., and/or severity of allergies, such as mild, medium, severe, etc., or any other relevant allergy information. Additionally or alternatively, the user interface 114 may be configured to receive input indicating preferences entered numerically rather than qualitatively, such as a maximum particulate matter count, a minimum temperature, etc. Moreover, the user interface 114 may be configured to receive data relating to the indoor space, such as the size of the space (e.g., 1000 square feet), the make/model of the HVAC unit 108, or any other relevant data. The data collected by the user device 102 via the user interface may be transmitted via a wired or wireless network 116 to the server 104.

The server 104 may include one or more processors 118 and a memory 120. The memory may be a computer-readable, non-transitory storage unit or device, or collection of units/devices, and may include persistent (e.g., hard disk) and/or non-persistent memory components. The memory may store instructions that are executable on the one or more processors to perform various operations, including the instructions of various software applications and the data that is generated and/or used by such applications. The stored instructions may include instructions for executing a predictive air quality model generator 122, an air filter replacement indicator 124, and an HVAC fan trigger 126.

The predictive air quality model generator may access any data input by the user at the user interface 114 and transmitted to the server 104. Moreover, the predictive air quality model generator 122 may access air quality data collected by the variety of smart sensors 106. The smart sensors 106 may include one or more of, for instance, a particulate matter sensor 128, a humidity sensor 130, a temperature sensor 132, a volatile compound sensor 134, a carbon monoxide sensor 136, and/or any other suitable smart sensors. One or more of each type of sensor 106 may be placed at various locations throughout an indoor space. For instance, there may be smart sensors 106 installed in several different rooms of a house, or in several different parts of a room. In particular, the smart sensors 106 may detect data relating to air quality data, which may include associated date and/or time data. Moreover, the smart sensors 106 may be configured to transmit data, continuously or periodically, to the server 104 via a wired or wireless network such as network 116.

Additionally or alternatively, the predictive air quality model generator 126 may access additional air quality data from one or more external database, such as a governmental air quality standards database 138 and/or an outdoor air quality information database 140, or any other relevant external database. The external databases 138, 140 may be periodically updated via a wired or wireless network, such as network 116.

Using the user input data from the user interface 114, the air quality data from the smart sensors 106, and/or the air quality data from the external databases 138, 140, the predictive air quality model generator 126 may generate a predictive air quality model. For instance, the predictive air quality model generator 126 may plot a time series for various data points and utilize linear progression based forecasting to predict values for various air quality data at future times. In embodiments, the predictive air quality model may be a set of models corresponding to various air quality data and/or other data, or it may one model incorporating one or more air quality data and/or other data. For example, the model may be a linear progression for volatile compound measurements over time, based on data from the volatile compound sensor 134. As another example, the model may be a linear progression for particulate matter per square foot of indoor space over time, (based on detected data from the particulate matter sensor 120, indoor space input from the user interface 114), which may be compared with governmental standards for air quality (from external database 138). Of course, depending on the preferences of the user, the external databases, and/or the types of sensors, additional or alternative types of models may be generated by the predictive air quality model generator 126.

Using the predictive air quality model and the data input from the user device 102, the air filter replacement indicator 124 may determine when an air filter 142 of the HVAC unit 108 needs to be replaced in order to maintain the air quality level selected by the user. For example, if the user selects a specific maximum particulate matter count, the air filter replacement indicator may analyze the predictive air quality model to determine an approximate date and/or time when the particulate matter count will reach that level. As another example, if the user selects a severe dust mite allergy, the air filter replacement indicator may additionally access an external database such as the databases 138, 140 for standard guidelines regarding a maximum particulate matter count for a severe dust mite allergy, and use the guidelines to determine the approximate date and/or time when the particulate matter count will reach the level indicated by the standard guidelines.

The predicted date and/or time may then be transmitted to the user device 102 via a wired or wireless network such as network 116. The user device 102 may then display, via the user interface 114, a notification to the user indicating the predicted date and/or time for optimal air filter replacement. Additionally or alternatively, the predicted date and/or time may be transmitted to the HVAC unit 108 via a wired or wireless network such as network 116, and a light, sound, or other indication may be displayed at the HVAC unit 108 at the predicted date/time or at a certain time interval prior to the predicted date and/or time.

In embodiments, an HVAC fan trigger 126 may periodically or continuously analyze the data from the various smart sensors 106, and/or the predictive air quality model in order to determine that there has been a temporary disruption in one or more air quality indicators. A temporary disruption may be caused by, for instance, smoke from cooking. For example, sensor data indicating an unexpected deviation from the predictive air quality model (or a difference between sensor data and predictive air quality model beyond a certain threshold) for a particular air quality measurement or set of air quality measurements over time may indicate a temporary disruption. When a temporary disruption is detected, the HVAC fan trigger 126 may transmit a signal to the HVAC unit 108 to power on a fan 144. Moreover, when the sensor data indicates that the temporary disruption has ended (i.e., that the sensor data no longer indicates a deviation from the predictive air quality model), the HVAC fan trigger 126 may transmit a signal to the HVAC unit 108 to power down the fan 144.

In embodiments where the various sensors 106 are located in different rooms or locations within the indoor space, the HVAC fan trigger may indicate a particular room or location where the sensor with the temporary disruption in air quality data is located, and trigger a fan in that room. For instance, if the temporary disruption is caused by smoke from cooking, the sensor data indicating the smoke would likely be detected most strongly by sensors 106 located in the kitchen, so that particular fan would be triggered.

Figure 2:
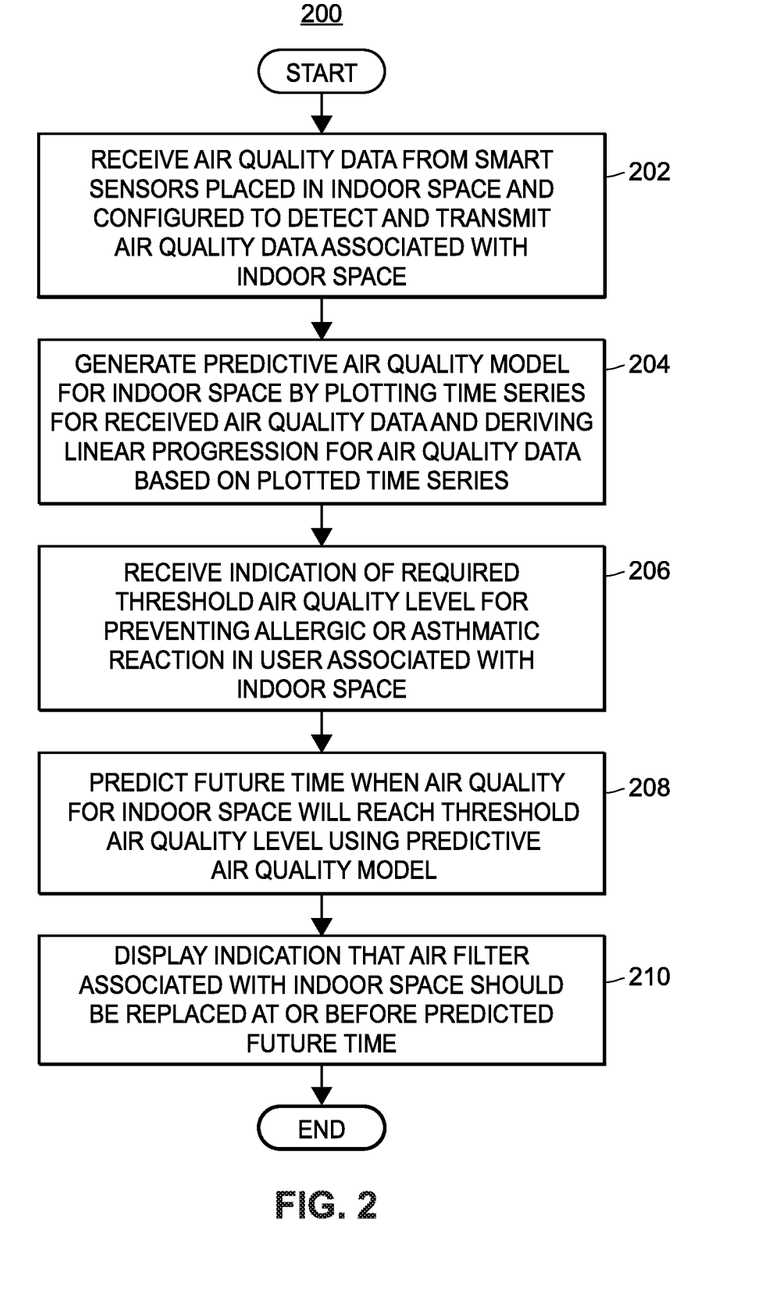
FIG. 2 depicts an exemplary method for estimating an approximate date and/or time for air filter replacement based on air quality.

FIG. 2 depicts an exemplary method (200) for estimating an approximate date and/or time for air filter replacement based on air quality measurements. The method may begin when air quality data from one or more smart sensors placed in an indoor space and configured to detect and transmit air quality data associated with the indoor space is received (block 202). For instance, the air quality data may include measurements of humidity, temperature, particulate matter count, volatile compound level, or any other suitable measurements of air quality. The air quality data may also include a time associated with each measurement. Additionally or alternatively, outdoor air quality information, outdoor allergen levels, or governmental air quality standards for a geographic region in which the indoor space is located may be accessed, and may be added to the air quality data.

At block 204, a predictive air quality model for the indoor space may be generated by plotting a time series for the received air quality data and deriving a linear progression for the air quality data based on the plotted time series. In various aspects, the predictive air quality model may be based on a plotted time series of one particular type of air quality data (e.g., particulate matter count over time), or may be based on, for instance, several plotted time series relating to different types of air quality data (e.g., particulate matter count over time and also temperature over time). The predictive air quality model may be periodically regenerated to incorporate the most current air quality data (e.g., every five minutes). In embodiments, the generation of the predictive air quality model may additionally be based on indications of one or more of, for instance, the size of the indoor space, a type of air filter associated with the indoor space, or a type of HVAC unit associated with the indoor space.

At block 206, an indication of a required threshold air quality level for preventing an allergic or asthmatic reaction in a user associated with the indoor space may be received. Like the air quality data, the required threshold air quality level may include a measurement of any one of humidity, temperature, particulate matter count, or volatile compound level, or any other suitable measurements of air quality. In particular, the required threshold air quality level may be a measurement above which an allergic or asthmatic reaction is likely to occur for a user associated with the indoor space. For instance, as per medical guidelines, a user who is frequently in an indoor space may be likely to experience an allergic or asthmatic reaction when the particulate matter count for the indoor space is above a certain number of parts per million.

At block 208, a future time when the air quality for the indoor space will reach the threshold air quality level may be predicted using the predictive air quality model. For instance, a linear progression model may indicate that the threshold air quality level will occur on Mar. 6, 2017, at 3:00 pm. At block 210, an indication that an air filter associated with the indoor space should be replaced at or before the predicted future time may be displayed. In embodiments, the indication may be displayed as part of a user interface of a user device (e.g., a mobile device notification). Additionally or alternatively, the indication may be a light, sound, or vibration by the user device, or a light, sound or vibration by an HVAC unit associated with the indoor space. In some examples, the indication may be repeatedly or continuously displayed until the air filter is changed or until the indication is dismissed by a user.

Figure 3:
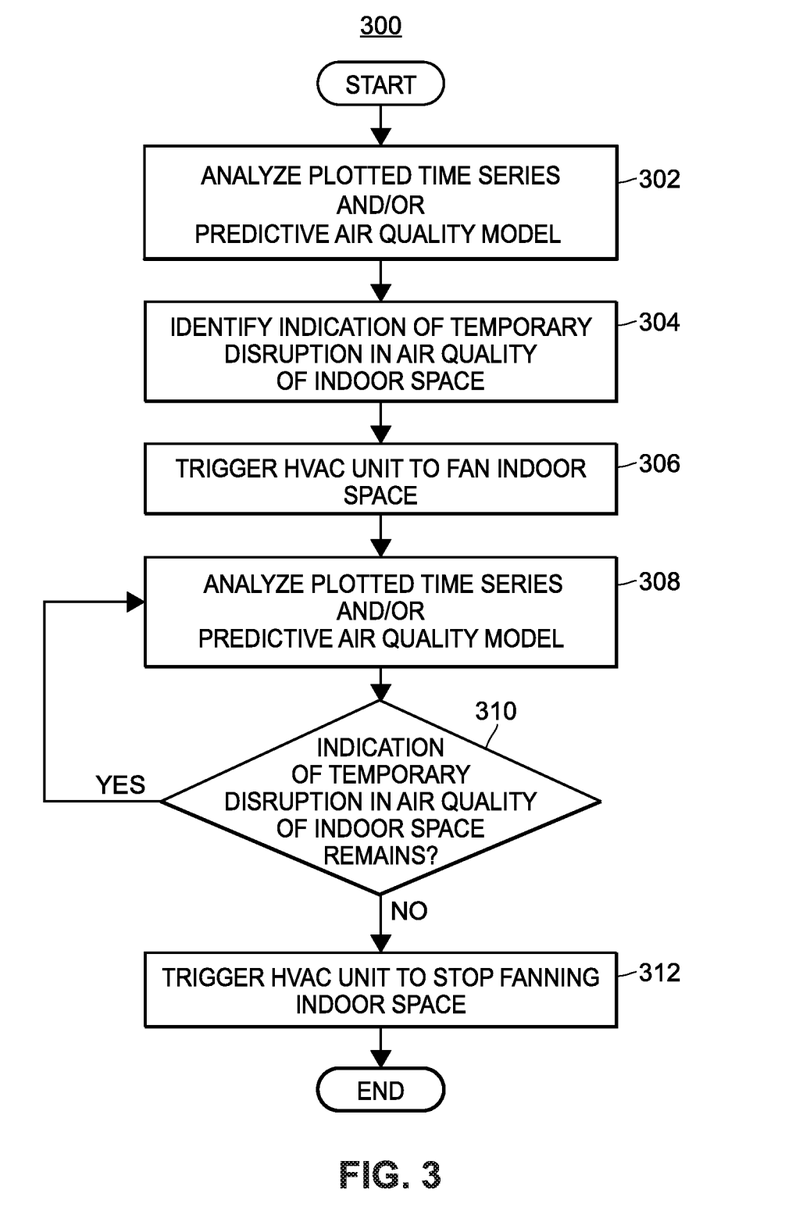
FIG. 3 depicts an exemplary method for triggering an HVAC fan when there is a temporary disruption or deviation in air quality data.

FIG. 3 depicts an exemplary method (300) for triggering an HVAC fan when there is a temporary disruption or deviation in air quality data. A temporary disruption or deviation in air quality data may be a spike in certain air quality measurements as a result of an activity within the indoor space that affects the air quality and/or the trajectory of the air quality of the space temporarily. For instance, an activity such as cooking may cause smoke in the indoor space, affecting the air quality of the indoor space temporarily during the period of cooking but not permanently affecting the air quality of the indoor space. As another example, an activity such as vacuuming may stir up dust in the indoor space temporarily during the period of vacuuming, affecting the air quality of the indoor space by adding dust particles to the air. But once the dust settles, for instance, the air quality of the indoor space may continue to progress as indicated by the predictive air quality model. Triggering the HVAC fan may cause an air quality measurement or an air quality trajectory to return to the air quality measurements and/or trajectories predicted by a predictive air quality model more quickly. The method may begin at block 302 when a plotted time series and/or predictive air quality model for an indoor space is analyzed.

At block 304, an indication of a temporary disruption in the air quality of the indoor space may be identified. The indication of the temporary disruption may be identified by, for instance, comparing the plotted time series to the predictive air quality model. For example, a current plotted time series may be compared to a predictive air quality model generated based on a prior plotted time series, or a current air quality measurement may be compared to a predicted air quality measurement generated based on the prior plotted time series (e.g., a predictive air quality model for 5:31 pm to 6:00 pm, generated based on air quality measurements from 4:00 pm-5:30 pm, may be compared to a plotted time series for air quality measurements detected by the smart sensors from 5:31 PM-6:00 pm). In particular, a difference between the slope/trajectory of the current plotted time series and the slope of the predictive air quality model above a certain threshold slope difference may indicate a temporary disruption in air quality. For instance, the plotted time series for air quality measurements detected by the smart sensors from 5:31 pm-6:00 pm may indicate a slope of 0.5 degrees change in temperature per minute, while the predictive air quality model predicts a slope of only 0.1 degrees change in temperature per minute from 5:31 pm-6:00 pm. If the threshold difference is, for instance, 0.2 degrees in temperature per minute, a slope difference of 0.4 degrees per minute may indicate a temporary disruption. Additionally or alternatively, a difference between the current air quality measurement at a certain time and the predicted air quality measurement for that time (e.g., current air quality measurement at 5:45 pm is 100 ppm from particulate matter sensor, predicted air quality measurement was 50 ppm for 5:45 pm) above a certain threshold difference (e.g., 25 ppm) may indicate a temporary disruption in air quality. In embodiments, the threshold air quality measurement difference or threshold slope difference may be based on the required threshold air quality level for preventing the allergic or asthmatic reaction in the user associated with the indoor space. For instance, the threshold air quality difference may be a certain percentage of the required threshold air quality level for preventing the allergic or asthmatic reaction in the user (e.g., 25%).

At block 306, an HVAC unit for the indoor space may be triggered to fan the indoor space based on the temporary disruption in the air quality of the indoor space. For example, the trigger to fan the indoor space may result from an indication transmitted from the electronic device over a wired or wireless network. In some aspects, the HVAC unit may only be triggered to fan a certain room or a certain area of the indoor space where the smart sensors detect air quality measurements indicating a temporary disruption in air quality. For instance, if sensors located in a kitchen detect air quality measurements indicating a temporary disruption, but other sensors detect air quality measurements indicating air quality levels close to predicted air quality levels, the HVAC unit may fan only the kitchen area.

At block 308, the plotted time series and/or predictive air quality model for the indoor space may be analyzed again. In embodiments, the analysis may occur continuously, or may occur periodically (e.g., every five minutes). At block 310, there may be a query as to whether the indication of the temporary disruption in the air quality of the indoor space remains. For instance, the temporary disruption in the air quality of the indoor space may remain if the slope difference or measurement difference that indicated the temporary disruption initially is still greater than the threshold difference. If so (block 310, YES), the plotted time series and/or predictive air quality model for the indoor space may be analyzed again (e.g., continuously, or periodically, such as every five minutes). If there is no longer the indication of the temporary disruption in the air quality of the indoor space (block 310, NO), the HVAC unit may be triggered (block 312) to stop fanning the indoor space.

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for automated correspondence management through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed:

1. A computer-implemented method for maintaining indoor air quality, comprising:
   receiving air quality data from one or more smart sensors placed in an indoor space and configured to detect and transmit air quality data associated with the indoor space,
      wherein the air quality data includes one or more measurement of at least one of humidity, temperature, carbon monoxide, particulate matter count, or volatile compound level, and a time associated with each measurement;
   generating, by a processor, a predictive air quality model for the indoor space by plotting a time series for the received air quality data and deriving a linear progression for the air quality data based on the plotted time series;
   receiving an indication of a required threshold air quality level for preventing an allergic or asthmatic reaction in a user associated with the indoor space,
      wherein the required threshold air quality level includes a measurement of at least one of humidity, temperature, carbon monoxide, particulate matter count, or volatile compound level, above which an allergic or asthmatic reaction is likely to occur in the user;
   predicting, by a processor, using the predictive air quality model, a specific future date or time when the air quality for the indoor space will reach the threshold air quality level; and
   displaying an indication that an air filter associated with the indoor space should be replaced at or before the predicted specific future date or time.

2. The computer-implemented method of claim 1, further comprising:
   accessing one or more of outdoor air quality information, outdoor allergen levels, or governmental air quality standards for a geographic region in which the indoor space is located, and wherein the air quality data includes measurements of one or more of the accessed outdoor air quality information, outdoor allergen levels, or governmental air quality standards.

3. The computer-implemented method of claim 1, further comprising:
receiving an indication of one or more of a size of the indoor space, a type of air filter associated with the indoor space, or a type of HVAC unit associated with the indoor space;
wherein generating the predictive air quality model is additionally based on one or more of the received size of the indoor space, type of air filter associated with the indoor space, or type of HVAC unit associated with the indoor space.

4. The computer-implemented method of claim 1, further comprising:
analyzing, by the processor, one or more of the plotted time series and the predictive air quality model to identify an indication of a temporary disruption in the air quality of the indoor space; and
triggering an HVAC unit to fan the indoor space based on the temporary disruption in the air quality of the indoor space.

5. The computer-implemented method of claim 4, wherein the indication of the temporary disruption in the air quality of the indoor space is identified by comparing the plotted time series to the predictive air quality model.

6. The computer-implemented method of claim 5, wherein the indication of the temporary disruption in the air quality of the indoor space is identified by comparing a current plotted time series or a current air quality measurement to a predictive air quality model or a predicted air quality measurement generated based on a prior plotted time series.

7. The computer-implemented method of claim 6, wherein the indication of the temporary disruption in the air quality of the indoor space is identified by:
a difference between the current air quality measurement and the predicted air quality measurement above a certain threshold measurement difference, or
a difference between a slope of the current plotted time series and a slope of the predictive air quality model above a certain threshold slope difference.

8. The computer-implemented method of claim 7, wherein the threshold measurement difference or threshold slope difference are based on the required threshold air quality level for preventing the allergic or asthmatic reaction in the user associated with the indoor space.

9. The computer-implemented method of claim 4, further comprising:
analyzing, by the processor, one or more of the plotted time series and the predictive air quality model to determine that there is no longer the indication of the temporary disruption in the air quality of the indoor space; and
triggering the HVAC unit to stop fanning the indoor space.

10. The computer-implemented method of claim 9, wherein the analyzing, by the processor, one or more of the plotted time series and the predictive air quality model to determine that there is no longer the indication of the temporary disruption in the air quality of the indoor space, occurs periodically after triggering the HVAC unit to fan the indoor space.

11. An electronic device configured to maintain indoor air quality, comprising:
a transceiver configured to communicate data via at least one network connection;
a memory configured to store non-transitory computer executable instructions;
a processor configured to interface with the transceiver and the memory, and configured to execute the non-transitory computer executable instructions to cause the processor to:
receive air quality data from one or more smart sensors placed in an indoor space and configured to detect and transmit air quality data associated with the indoor space,
wherein the air quality data includes one or more measurement of at least one of humidity, temperature, carbon monoxide, particulate matter count, or volatile compound level, and a time associated with each measurement;
generate a predictive air quality model for the indoor space by plotting a time series for the received air quality data and deriving a linear progression for the air quality data based on the plotted time series;
receive an indication of a required threshold air quality level for preventing an allergic or asthmatic reaction in a user associated with the indoor space,
wherein the required threshold air quality level includes a measurement of at least one of humidity, temperature, particulate matter count, or volatile compound level, above which an allergic or asthmatic reaction is likely to occur in the user;
predict, using the predictive air quality model, a specific future date or time when the air quality for the indoor space will reach the threshold air quality level; and
display an indication that an air filter associated with the indoor space should be replaced at or before the predicted specific future date or time.

12. The electronic device of claim 11, wherein the computer-executable instructions further cause the processor to:
access one or more of outdoor air quality information, outdoor allergen levels, or governmental air quality standards for a geographic region in which the indoor space is located, and
wherein the air quality data includes measurements of one or more of the accessed outdoor air quality information, outdoor allergen levels, or governmental air quality standards.

13. The electronic device of claim 11, wherein the computer-executable instructions further cause the processor to:
receive an indication of one or more of a size of the indoor space, a type of air filter associated with the indoor space, or a type of HVAC unit associated with the indoor space; and
wherein generating the predictive air quality model is additionally based on one or more of the received size of the indoor space, type of air filter associated with the indoor space, or type of HVAC unit associated with the indoor space.

14. The electronic device of claim 11, wherein the computer-executable instructions further cause the processor to:
analyze one or more of the plotted time series and the predictive air quality model to identify an indication of a temporary disruption in the air quality of the indoor space; and
trigger an HVAC unit to fan the indoor space based on the temporary disruption in the air quality of the indoor space.

15. The electronic device of claim 14, wherein the indication of the temporary disruption in the air quality of the indoor space is identified by comparing the plotted time series to the predictive air quality model.

16. The electronic device of claim 15, wherein the indication of the temporary disruption in the air quality of the indoor space is identified by comparing a current plotted time series or a current air quality measurement to a predictive air quality model or a predicted air quality measurement generated based on a prior plotted time series.

17. The electronic device of claim 16, wherein the indication of the temporary disruption in the air quality of the indoor space is identified by:
- a difference between the current air quality measurement and the predicted air quality measurement above a certain threshold measurement difference, or
- a difference between a slope of the current plotted time series and a slope of the predictive air quality model above a certain threshold slope difference.

18. The electronic device of claim 17, wherein the threshold measurement difference or threshold slope difference are based on the required threshold air quality level for preventing the allergic or asthmatic reaction in the user associated with the indoor space.

19. The electronic device of claim 14, wherein the instructions further cause the processor to:
- analyze one or more of the plotted time series and the predictive air quality model to determine that there is no longer the indication of the temporary disruption in the air quality of the indoor space; and
- trigger the HVAC unit to stop fanning the indoor space.

20. The electronic device of claim 19, wherein the instructions causing the processor to analyze one or more of the plotted time series and the predictive air quality model to determine that there is no longer the indication of the temporary disruption in the air quality of the indoor space are executed periodically after triggering the HVAC unit to fan the indoor space.

\* \* \* \* \*